(12) United States Patent
Emoto (10) Patent No.: US 8,151,517 B2
(45) Date of Patent: Apr. 10, 2012

(54) PLANT GROWTH SYSTEM

(75) Inventor: Kenji Emoto, Kyoto (JP)

(73) Assignee: Fairy Plant Technology Inc., Kyoto-shi (JP)

( * ) Notice: Subject to any disclaimer, the term of this patent is extended or adjusted under 35 U.S.C. 154(b) by 92 days.

(21) Appl. No.: 12/593,881

(22) PCT Filed: Mar. 28, 2008

(86) PCT No.: PCT/JP2008/056176
§ 371 (c)(1), (2), (4) Date: Sep. 29, 2009

(87) PCT Pub. No.: WO2008/123448
PCT Pub. Date: Oct. 16, 2008

(65) Prior Publication Data
US 2010/0126063 A1 May 27, 2010

(30) Foreign Application Priority Data
Mar. 30, 2007 (JP) .................................. 2007-091984

(51) Int. Cl.
*A01G 31/00* (2006.01)
*A01G 9/00* (2006.01)
(52) U.S. Cl. ............................................... 47/60; 47/17
(58) Field of Classification Search .................. 47/59 R, 47/59 S, 60, 61, 62 R, 62 A, 62 C, 62 N, 47/63, 17, 39
See application file for complete search history.

(56) References Cited

U.S. PATENT DOCUMENTS

| 7,176,024 | B2 * | 2/2007 | Branson et al. | 435/420 |
| 7,278,237 | B2 * | 10/2007 | Okabe et al. | 47/60 |
| 2003/0101645 | A1 * | 6/2003 | Cole et al. | 47/61 |
| 2007/0094926 | A1 * | 5/2007 | Branson et al. | 47/60 |
| 2007/0144067 | A1 * | 6/2007 | Farhadi | 47/39 |
| 2009/0301979 | A1 * | 12/2009 | Tanaka et al. | 211/49.1 |

FOREIGN PATENT DOCUMENTS

| JP | 64-013919 | 1/1989 |
| JP | 02-276514 | 11/1990 |
| JP | 02-283216 | 11/1990 |
| JP | 4-10747 | 3/1992 |

(Continued)

OTHER PUBLICATIONS

ISA/Japanese Patent Office, International Search Report of PCT/JP2008/056176, Jul. 8, 2008, 3 pages, Japan.

*Primary Examiner* — T. Nguyen
(74) *Attorney, Agent, or Firm* — Alleman Hall McCoy Russell & Tuttle LLP (57) ABSTRACT

It is intended to provide a plant growth system wherein light sources are located close to plants so as to efficiently ensure a sufficient amount of light for the plants to grow and simultaneously ensure air flow, thereby providing a favorable growth environment for the plants. In a plant growth chamber, there are provided multiple shelf parts for irradiating the plants with light for the growth, a cover surrounding the light sources wherein multiple ventilation bores are formed on a plant-facing face of a transparent light-permeable wall, an air inlet that opens in the space within the cover for sucking the air in the space, and a circulation channel that cools down the air sucked through the air inlet and blows out the sucked air into the plant growth chamber.

6 Claims, 10 Drawing Sheets

FOREIGN PATENT DOCUMENTS

| | | |
|---|---|---|
| JP | 2000-097586 | 4/2000 |
| JP | 2002-115870 | 4/2002 |
| JP | 2002-119149 | 4/2002 |
| JP | 2004-121074 | 4/2004 |
| JP | 2005-021064 | 1/2005 |
| JP | 2006-288209 | 10/2006 |

* cited by examiner

PLANT GROWTH SYSTEM

FIELD OF THE ART

This invention relates to a plant growth system that can provide a favorable environment for the plants to grow.

BACKGROUND ART

Conventionally, a plant culture facility that promotes the growth of plants by irradiating the light on the plants has been known.

Concretely, this kind of the plant culture facility has a configuration that a culture bed is placed on a culture shelf supported by multiple pillars and a culture fluid is circulated in the culture bed and light is irradiated on plants by a lighting system mounted on an undersurface of the culture shelf so as to promote growth of the plants (for example, refer to patent document 1).

Patent document 1: Japan patent laid-open number 2005-021064

DISCLOSURE OF THE INVENTION

Problems to be Solved by the Invention

However, with the conventional arrangement, if the light source is placed closer to the plants in order to obtain a big amount of light or to tighten a density of the plant to be cultured, there is a problem that the plants get damaged by the air heated near the light source. In addition, if plants are arranged just closely to each other in order to improve the density of the plants to be cultured, there is a problem that the growth of the plants becomes inadequate due to deterioration of ventilation.

The present claimed invention focuses attention on this problem and a main object of this invention is to provide a plant growth system that can give a favorable environment for the plants to grow by arranging the light source and the plants closely while efficiently ensuring a sufficient amount of light for the plants to grow and ensuring favorable ventilation.

Means to Solve the Problems

More specifically, the plant growth system in accordance with this invention is characterized by comprising multiple shelf parts that are arranged in a chamber and on which plants are to be placed, a light source arranged above each shelf part for irradiating the plants with light for the growth, a cover that is arranged to surround the light source wherein multiple ventilation bores are formed and at least one part of the cover is a light-permeable transparent wall, an air inlet that opens in the space within the cover for sucking the air in the space, and a circulation channel that cools down the air sucked from the air inlet and blows out the air into the chamber.

The transparent wall may be, for example, translucent as far as it can transmit the light more than a predetermined amount of light.

In accordance with this arrangement, the air within the cover heated by the light source is sucked into the circulation channel through the air inlet and then cooled down. Next the fresh air cooled down in the circulation channel circulates around, for example, the whole of the chamber, and is then taken into the inside of the cover through the ventilation bore. As a result, it is possible to prevent a problem that the plants get damaged by the heated air near the light source. In addition, since this system adopts a sucking method to suck the air in the cover into the circulation channel through the air inlet, the cooled-down air is taken into the cover through the ventilation bore while the air touches the plants with a relatively soft air flow. This prevents the problem that the plants suffer from insufficient growth due to a stress from a strong air flow. Furthermore, even though the plants are closely-planted, it is possible to efficiently exchange the air near the plants, thereby preventing a shortage of oxygen or heat damage for the plants.

In addition, since the light from the light source reaches the plants through the transparent plant-facing wall, it is possible to realize a preferable sunshine environment necessary for photosynthesis. Furthermore, since it is possible to arrange the light source and the plants closely by shortening a vertical distance between the shelf parts as much as possible, it is possible to efficiently ensure a sufficient amount of light for the plants to grow and to provide the plants with a preferable environment for photosynthesis. Furthermore, since the light source is surrounded by the cover, the plants will never suffer from a problem such as leaf scorch due to direct contact with the light source, even though the light source is arranged close to the plants.

More specifically, it is possible to provide a plant growth system that can give a suitable environment for the plants to grow by effectively ensuring enough light intensity for the plants to grow with the arrangement that the light source and the plants are placed as close as possible without causing a problem such that the plants get damaged by the heated air and by ensuring favorable ventilation and preventing heat damage although the density of the plants in a vertical direction of the shelf part is increased.

In addition, as another embodiment of the plant growth system in accordance with this invention represented is a plant growth system comprising multiple shelf parts that are arranged in a chamber and on which plants are to be placed, LEDs arranged above each shelf part for irradiating the plants with light for the growth, a cover comprising a board that supports the LEDs to face the plants and a surrounding part that surrounds a back surface of the board on which the LEDs are loaded wherein multiple ventilation bores are formed on the board or the surrounding part, an air inlet that opens in the space within the cover for sucking the air in the space, and a circulation channel that cools down the air sucked through the air inlet and blows out the air into the chamber.

In accordance with this arrangement, the air within the cover heated by the heat generated from the back surface of the LED loaded surface of the board is sucked into the circulation channel through the air inlet and then cooled down. Then the fresh air cooled down in the circulation channel circulates around, for example, the whole of the chamber, and is taken into the inside of the cover through the ventilation bore. As a result, it is possible to prevent a problem that the plants get damaged by the air heated by the heat generated from the back surface of the LED loaded surface of the board. In addition, since this system adopts a sucking method to suck the air in the cover into the circulation channel through the air inlet, the cooled-down air is taken into the cover through the ventilation bore while touching the plants with a relatively soft air flow. This prevents the problem that the plants suffer from insufficient growth due to a stress from the air flow. Furthermore, even though the plants are closely-planted, it is possible to efficiently exchange the air near the plants, thereby preventing a shortage of oxygen or heat damage for the plants.

In addition, since the light from the LEDs as being the light source reaches the plants through the transparent plant-facing wall, it is possible to realize a preferable sunshine environment necessary for photosynthesis. Furthermore, since it is possible to arrange the LEDs and the plants closely by shortening a vertical distance between the shelf parts, it is possible to efficiently ensure a sufficient amount of light for the plants to grow and to provide the plants with a preferable environment for photosynthesis. Furthermore, since the LED has an arrangement that the LED element is molded by a transparent resin like a round type LED, the plant side surface of the LED will rarely generate the heat. Then the plants will never suffer from a problem such as leaf scorch due to direct contact with the light source, even though the LEDs are arranged closely to the plants.

If the air inlet is arranged at a generally whole surface of the cover facing the plants, it is possible to take in the air near the plants through the ventilation bores and to circulate the air over whole of the shelf part irrespective of a distance between the shelf posts supporting both ends of the shelf part. As a result, an effect that a restriction on designing the shelf part or the shelf posts becomes small can be obtained.

As a preferable embodiment of this invention represented is a plant growth system comprising an air flow direction switch part that switches from an air sucking state to suck the air in the cover into the circulation channel through the air inlet, to an air blowing out state to blow out the air in the circulation channel into the cover through the air inlet and vice versa in compliance with the state that the light source is lit or turned off.

In accordance with this arrangement, for example, at a time when the light source is in a turned off state, the air cooled down in the circulation channel can be supplied to the plants from the ventilation bore through the air inlet. Namely, it is possible to preferably realize a growing environment such as a sunshine environment created at night, in which the plants produce sugar in a cold state so that plants containing much more sugar can be produced while using the system. In addition, since it is possible to directly and locally supply the plants with the cooled-down air through the ventilation bore, power-saving can be realized without requiring a big cooling system.

If a natural cooling part to naturally cool down the air is arranged in the circulation channel, it is possible to conduct the cooling process efficiently with low cost by making use of the property of the natural cooling, namely, the heat of the air of high temperature can be deprived effectively and the temperature of the natural cooling part itself (for example, underground) does not change even though the air is naturally cooled down. As a concrete embodiment of the natural cooling part represented, a natural cooling part comprising multiple cooling pipes, each of which is connected in series or in parallel, and each of the cooling pipes is buried in a vertical state at a predetermined depth below ground. In accordance with this arrangement, the underground has an extremely big thermal capacity and the higher the temperature of the air that passes the cooling pipe is, the more efficient the cooling effect becomes. It is possible to securely cool down the air to 16 degrees C. by making use of a condition where the temperature at a position 5 meters below ground is about 16 degrees C. by burying the cooling pipes at a position deeper than 5 meters below ground.

As a preferable embodiment of the cooling pipe represented is a cooling pipe of a double-channel structure having a center internal flow channel located at the center and an outer internal flow channel located at the outside of the internal flow channel, and the air taken into the cooling pipe flows in the outer internal flow channel and the center internal flow channel in sequence.

In accordance with this arrangement, it is possible to prevent the air cooled down deep in the ground from being heated at a time when the air returns to the surface of the ground and to give the moderately cooled-down air to the plants.

As a preferable embodiment of the present claimed invention represented is a plant growth system comprising a forced cooling air supply channel that forcedly cools down the air taken from the chamber and supplies the plant with the forcedly cooled-down air, and a channel switch part that switches the channel connected to the air inlet to the circulation channel or to the forced cooling air supply channel.

In accordance with this arrangement, it is possible to easily suck the air heated in the cover into the circulation channel or to easily supply the plants with the forcedly cooled-down air through the air inlet or the ventilation bore just by switching the channel switch part.

Effect of the Invention

In accordance with the plant growth system in accordance with this invention, a sufficient amount of light for the plants to grow can be ensured by arranging the light source and the plants as close as possible, a problem such that the plants get damaged by the heated air can be prevented with improving the density of the plants in a vertical direction of the shelf part and a favorable ventilation can be ensured with preventing a heat damage so that the plant growth system that can give a suitable environment for the plants to grow can be provided.

EXPLANATION OF THE REFERENCE CODE

A1 . . . air
L1 . . . circulation channel
L2 . . . forced cooling air supply channel
L3 . . . individual channel
L12 . . . natural cooling part
Lp . . . cooling pipe
Lp1 . . . center internal flow channel
Lp2 . . . outer internal flow channel
V . . . plants
Z . . . plant growth system
1 . . . chamber (plant growth chamber)

6 ... channel switch part
31 ... shelf post
31a ... air inlet
32 ... shelf part
33 ... light irradiation unit
331 ... light source (fluorescent light or LEDs)
332 ... cover
3321 ... plant-facing surface (plant-facing wall)
3321a ... back surface of LED loaded surface
332x ... ventilation bore

BEST MODES OF EMBODYING THE INVENTION

One embodiment of this invention will be explained with reference to drawings.

Figure 1:
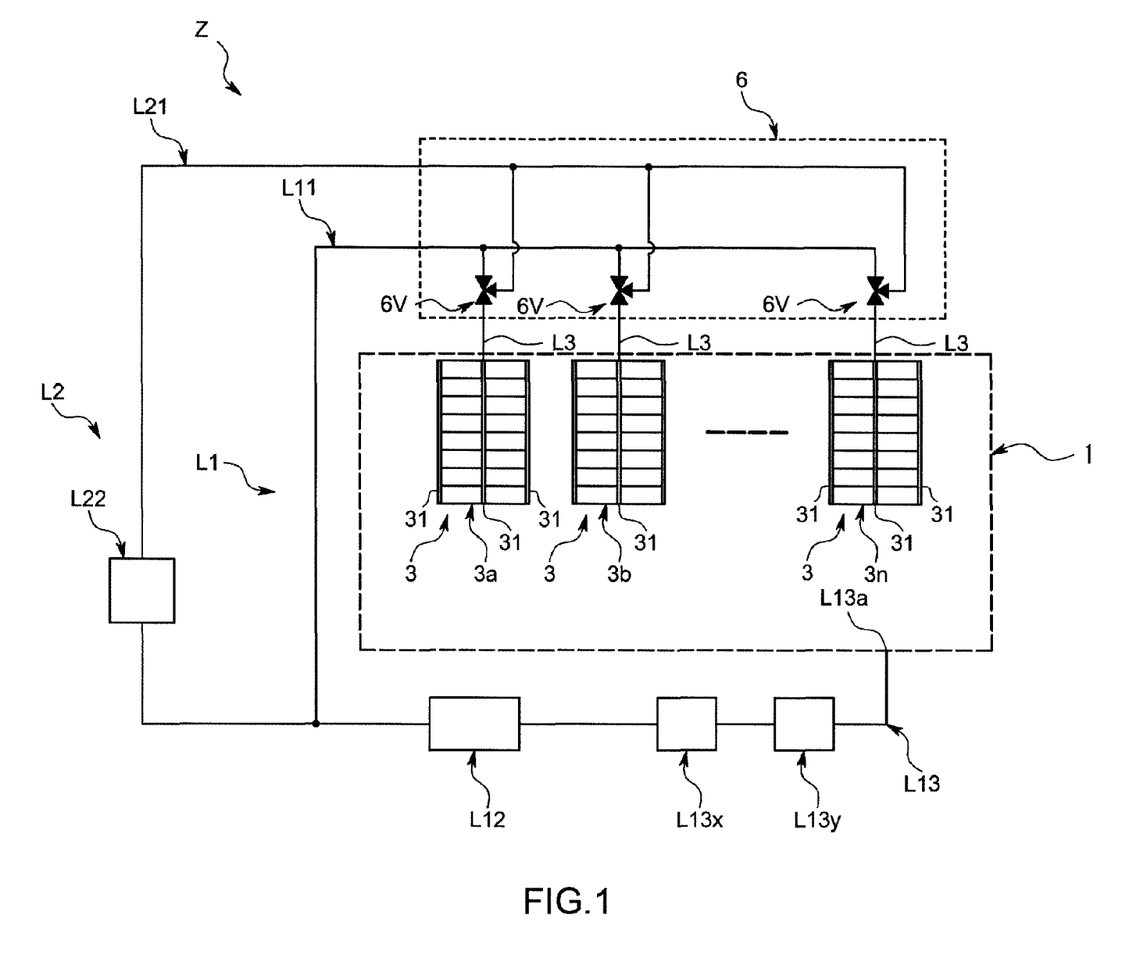
FIG. 1 is a block diagram showing a channel switch part and a circulation channel of a plant growth system in accordance with one embodiment of this invention.
Figure 2:
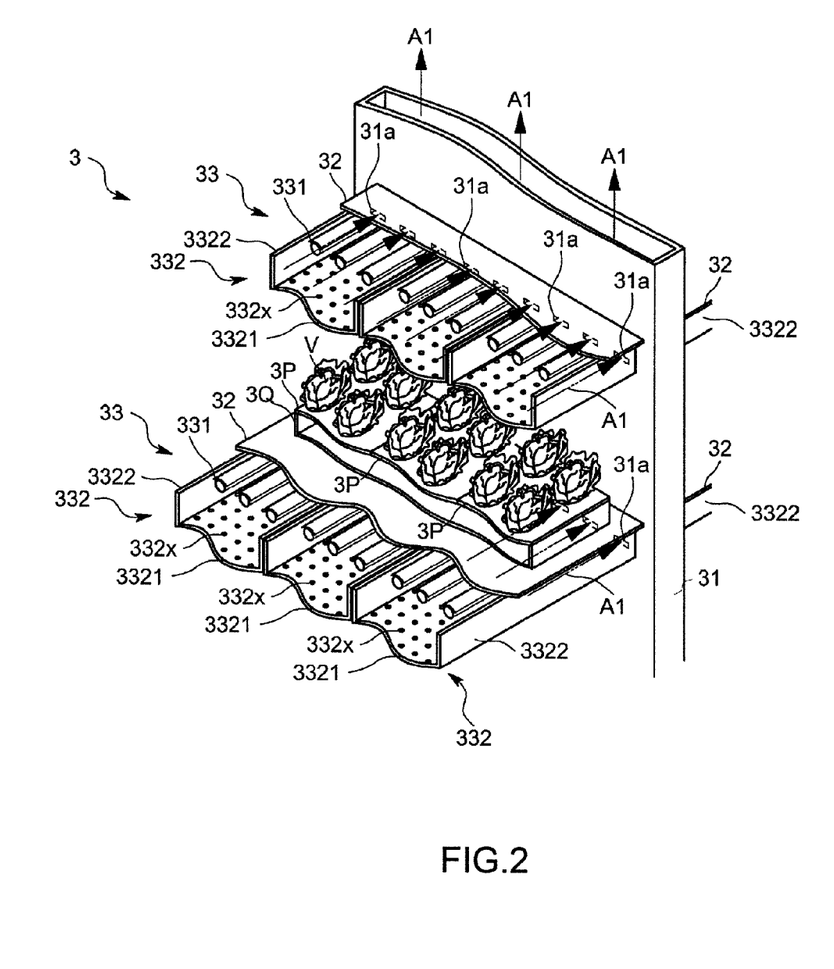
FIG. 2 is an enlarged perspective pattern view showing a shelf part of this embodiment

A plant growth system Z in accordance with this embodiment comprises, as shown in FIG. 1, a plant growth chamber 1 for growing plants in a house, a circulation channel L1 and a forced cooling air supply channel L2 arranged in the outside of the plant growth chamber 1.

Figure 3:
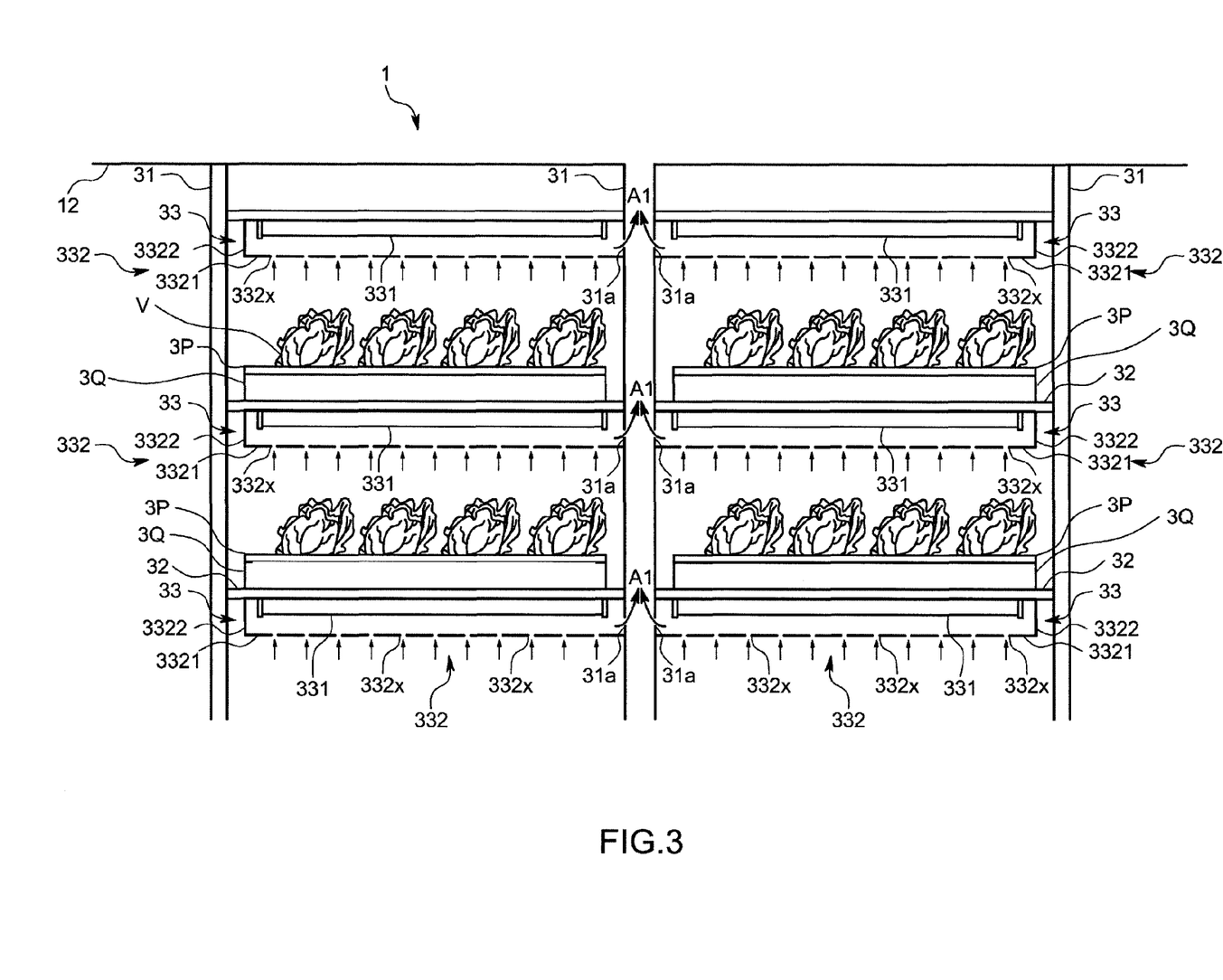
FIG. 3 is an enlarged front view of the shelf part of this embodiment.
Figure 4:
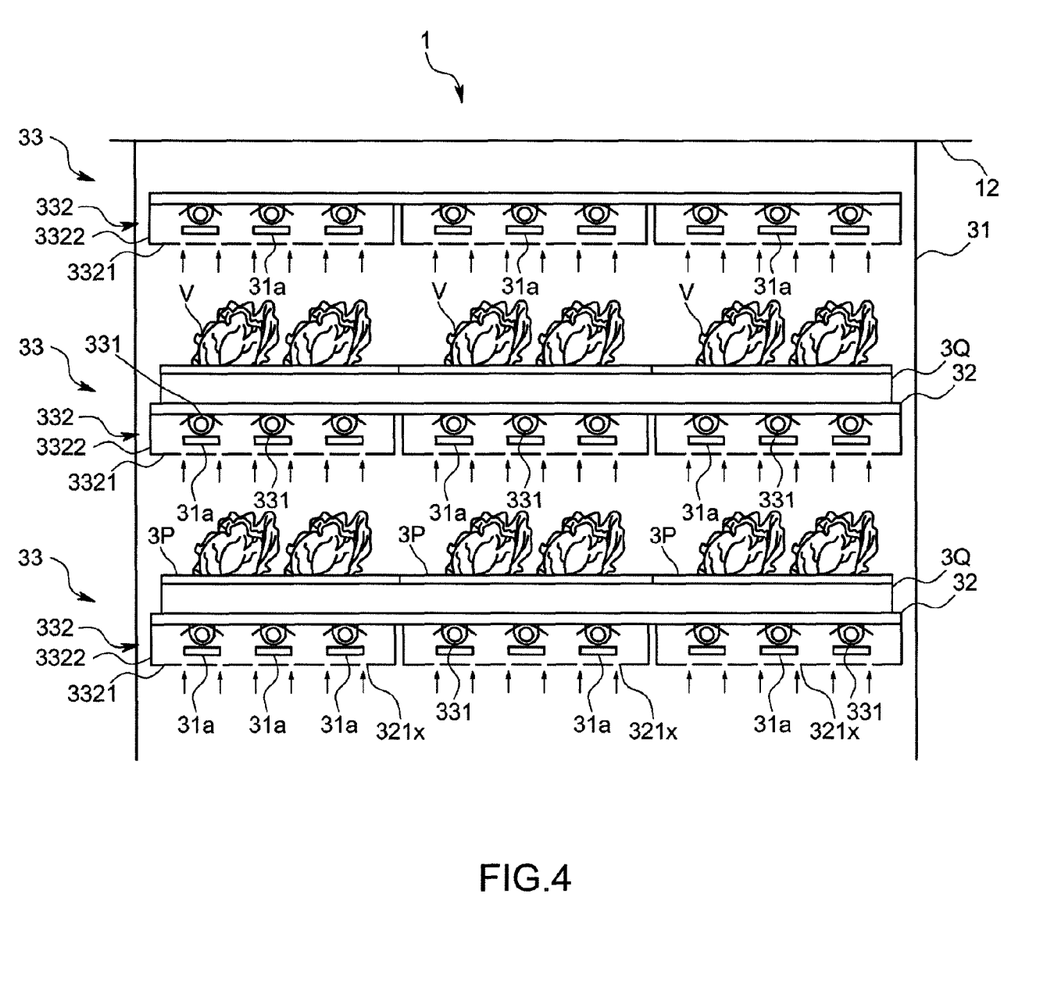
FIG. 4 is an enlarged side view of the shelf part of this embodiment.

The plant growth chamber 1 comprises, as shown in FIG. 1, FIG. 3 and FIG. 4, multiple shelf units 3 having shelf parts 32 for growing the plants, an air inlet 31a through which the air A1 in the shelf unit 3 is sucked into the circulation channel L1, a channel switch part 6 that switches a channel connected to the air inlet 31a to the circulation channel L1 or to the forced cooling air supply channel L2 individually and a fertilizer supply unit (not shown in drawings) that supplies fertilizer. Next, each part will be concretely explained.

The shelf unit 3 comprises, as shown in FIG. 1, FIG. 2, FIG. 3 and FIG. 4, multiple shelf posts 31 arranged to stand between a floor surface (not shown in drawings) and a ceiling surface 12 of the plant growth chamber 1, the shelf parts 32 for growing the plants supported by the shelf posts 31, and light irradiation units 33 to irradiate the plants growing on the shelf part 32 with the light.

The shelf post 31 is of a general rectangular shape in section and an internal space surrounded by each side wall is an internal flow channel where a gaseous body flows. In this embodiment, ten tiers of the shelf parts 32 are supported by a pair of the shelf posts 31. A number of the shelf part 32 supported by the shelf posts 31 can be varied arbitrarily.

The shelf part 32 supports a liquid fertilizer palette 3Q of a general box shape inside of which a liquid fertilizer can be held and multiple palettes for cultivation 3P to be placed on the liquid fertilizer palette 3Q. In this embodiment, the shelf part 32 is in a plate shape, however, multiple pipes may be horizontally arranged. In addition, it is possible for the palettes for cultivation 3P to culture multiple plants V (for example, lettuce) at once.

The light irradiation unit 33 is arranged on the undersurface of each shelf part 32, and comprises a light source 331 and a cover 332 to surround the light source 331.

More concretely, for example, a fluorescent light that emits the white light is used as the light source 331. In this embodiment, a lighting time of the light source 331 can be controlled by a main system for controlling growth, not shown in drawings. With this arrangement, it is possible to give a desired sunlight environment to the plants growing on the shelf part 32 such that a sunlight environment of a daytime cycle is given by turning on the light source 331 or a nighttime cycle is given by turning off the light source 331. In this embodiment, the light source 331 is mounted on the undersurface of the shelf part 32 just above the plants, however, a mounted state of the light source 331 may be varied arbitrarily.

The cover 332 is a channel shape facing upward in cross-section comprising a plant-facing wall 3321 of a general rectangular shape in a plane view as being a surface facing to the plant and cover side walls 3322 standing from both side edges of the plant-facing wall 3321. In this embodiment, each of the plant-facing wall 3321 and the cover side wall 3322 is a transparent wall (for example, an acrylic plate) that can transmit the light generally directly from the light source 331. In addition, multiple ventilation bores 332x are arranged on a generally whole surface of the plant-facing wall 3321. Furthermore, each end edge of the plant-facing wall 3321 and the cover side wall 3322 is tightly mounted on the shelf post 31 and each upper end edge of the plant-facing wall 3321 and the cover side wall 3322 is tightly mounted on a bottom surface of the shelf part 32 so as to effectively discharge or intake the air from the air inlet 31a by taking the air into the cover 332 through the ventilation bores 332x or by discharging the air from the cover 332 through the ventilation bores 332x.

The air inlet 31a is a through bore formed on the side wall of the shelf post 31 of the shelf unit 3. In this embodiment, three air inlets 31a are arranged at every position surrounded by each cover 332 on the side wall of the shelf post 31 respectively. A shape of the opening of each air inlet 31a is of a generally rectangular, however, it is not limited to this.

The channel switch part 6 comprises, as shown in FIG. 1 or the like, a valve 6V arranged in an individual channel L3 individually connected to the air inlet 31a of each shelf unit 3. Each individual channel L3 can be selectively connected to the circulation channel L1 or to the forced cooling air supply channel L2 by individually controlling each valve 6V by means of a switch control unit (not shown in drawings).

The fertilizer supply unit, although its detail is not drawn, supplies the shelf part 32 with the liquid fertilizer wherein each nutrient is appropriately mixed into water through a fertilizer supply inlet (not shown in drawings).

The circulation channel L1 comprises, as shown in FIG. 1, an air sucking duct L11 arranged in the outside (for example, under roof or the like) of the plant growth chamber 1, a natural cooling part L12 arranged under floor of the plant growth chamber 1 and a duct L13 arranged in the outside (for example, under roof or the like) of the plant growth chamber 1. Each part will be explained concretely.

The air sucking duct L11 comprises a fan (not shown in drawings) that sucks the air in the shelf unit 3 into the inside of the air sucking duct L11 and sends the sucked air to the natural cooling part L12. A speed of sucking the air can be varied arbitrarily by adjusting the fan in the air sucking duct L11 in order to avoid a case that the speed to suck the air to the circulation channel L1 from the air inlet 31a is too fast in relation to a volume of the natural cooling part L12. In addition, in this embodiment, it is possible to discharge the air in the circulation channel L1 to the cover 32 from the air inlet 31a, namely, "it is possible to create a state of discharging the air" by counter-rotating both the fan and a fan, to be described later, of the duct L13 by the use of an air flow direction switch part, not shown in drawings.

Figure 5:
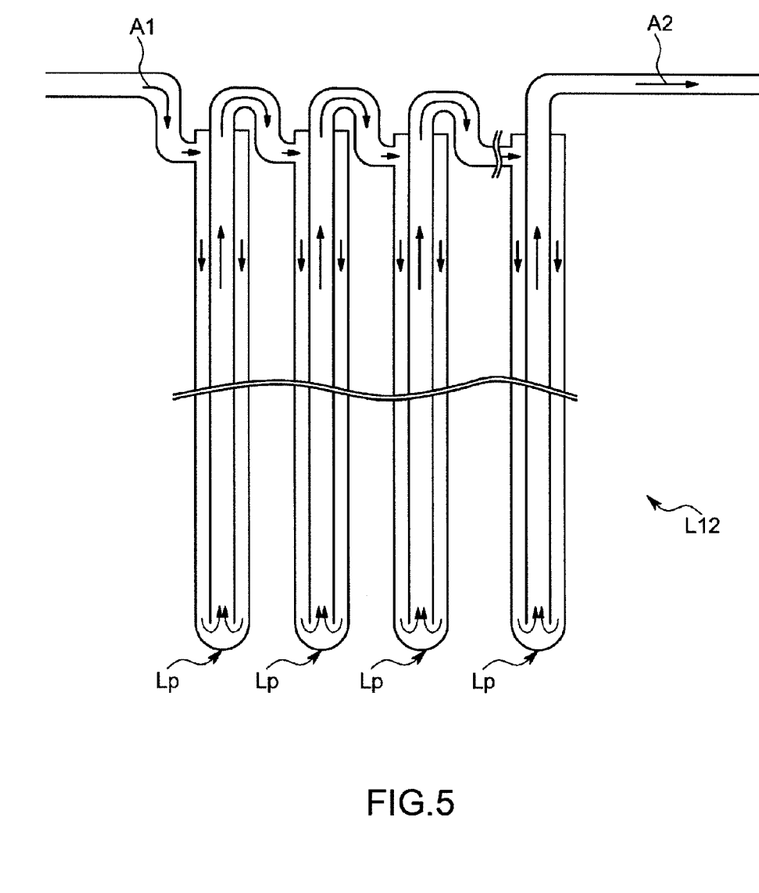
FIG. 5 is an enlarged view of a natural cooling part of this embodiment.
Figure 6:
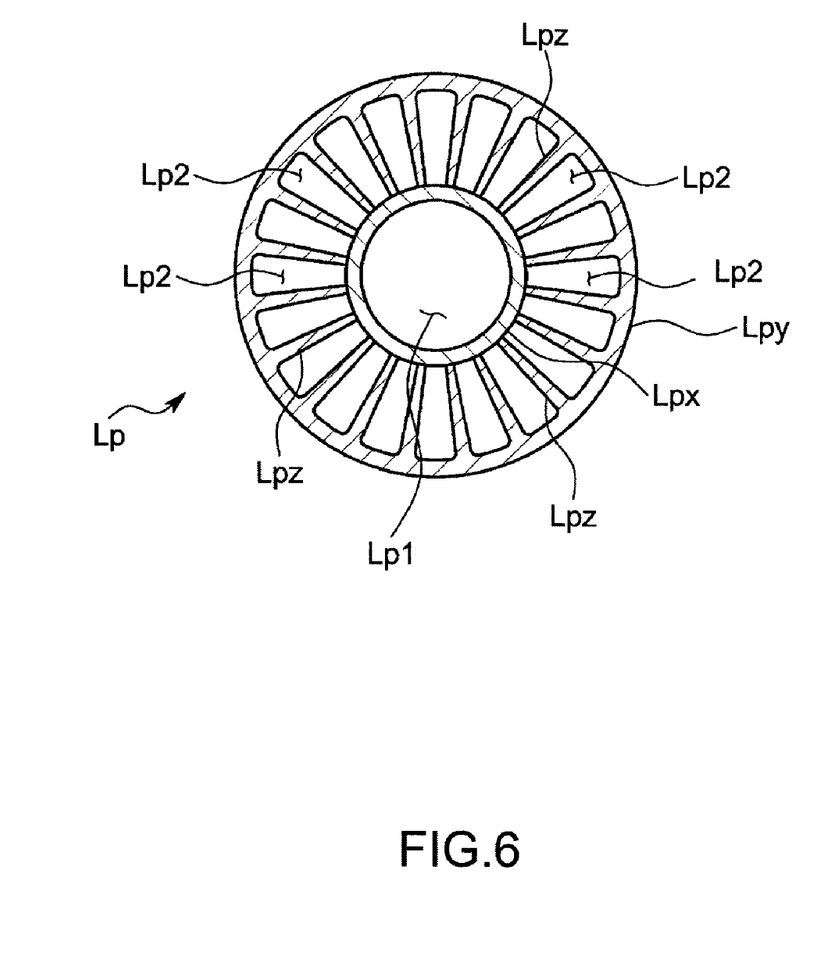
FIG. 6 is a transverse sectional view of a cooling pipe of this embodiment.
Figure 7:
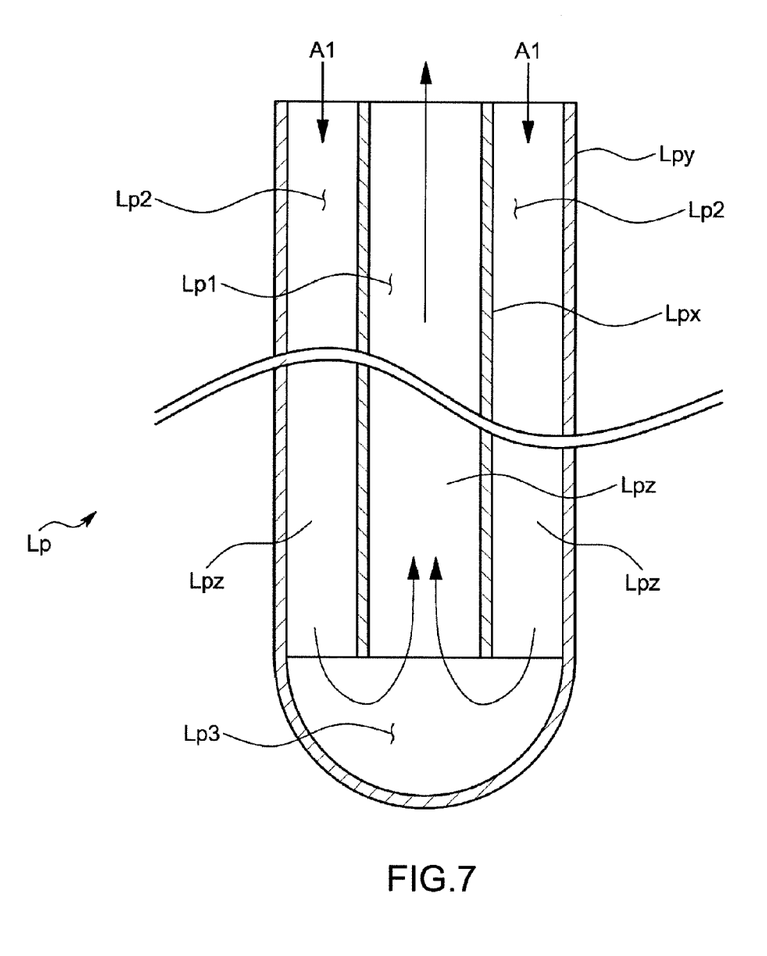
FIG. 7 is a side cross-sectional view of the cooling pipe of this embodiment.

The natural cooling part L12 cools down the air A1 heated by the light irradiation unit 33, as shown in FIG. 1 and FIG. 5, by making use of the temperature in the ground, more concretely by making use of a condition where the temperature at a position, for example, 5 meters below ground is regularly about 16 degrees C. In this embodiment, the natural cooling part L12 is realized by burying multiple cooling pipes Lp connected in series or in parallel in a vertical state at a position deeper than 5 meters below ground. The cooling pipe Lp is a double tube structure. More concretely, as shown in FIG. 6 and FIG. 7, the cooling pipe Lp comprises a center pipe Lpx, an outer pipe Lpy, and multiple bulkhead walls Lpz that extend radially from the center pipe Lpx toward the outer pipe Lpy and that divide a space between the center pipe Lpx and the outer pipe Lpy so as to have multiple internal channels formed by the center pipe Lpx, the outer pipe Lpy and multiple bulkhead walls Lpx. More concretely, the cooling pipe Lp comprises a center internal flow channel Lp1 formed inside of the center pipe Lpx, an outer internal flow channel Lp2 comprising multiple diversion channels each of which is surrounded by the center pipe Lpx, the outer pipe Lpy and the bulkhead walls Lpz, and a connecting internal channel Lp3 that connects one end side (lower end side) of the center internal flow channel Lp1 and one end side (lower end side) of the outer internal flow channel Lp2. In this embodiment, since the air A1 enters from an opening of the outer internal flow channel Lp2 and flows from the outer internal flow channel Lp2, via the connecting internal channel Lp3 and to the center internal flow channel Lp1 in this order, and then flows out from an opening of the center internal flow channel Lp1, and because the center pipe Lpx is made of a vinyl chloride pipe and the outer pipe Lpy and the bulkhead walls Lpx are made of metal, the air cooled down deep in the ground can be prevented from being heated at a time when the air returns to the surface of the ground.

The duct L13 comprises a fan (not shown in drawings) that sucks the air from the natural cooling part L12 into the inside of the duct L13 and blows out the sucked air to the inside of the plant growth chamber 1 through an air inlet L13a that opens on a wall surface of the ceiling of the plant growth chamber 1.

By the use of the circulation channel L1, it is possible to circulate the air A1 by sucking the air A1 in the shelf unit 3 into the air sucking duct L11 through the air inlet 31a and sends the sucked air A1 to the natural cooling part L12 and the duct L13 in this order and then blows out the air A1 to the inside of the plant growth chamber 1 through the air inlet L13a.

In addition, an air conditioner L13x and an air filter L13y are arranged in the middle of the duct L13 in this embodiment. Basically the air conditioner L13x is not put into operation, however, in case that a sufficient cooling effect is not obtained by means of the natural cooling part L12 alone, the air conditioner L13x is put into operation based on an output value of a temperature sensor (not shown in drawings) arranged near the air inlet L13a. More concretely, in case that the temperature of the air A2 blown out from the air inlet L13a is greater than or equal to a set value, the air conditioner L13x is put into operation so as to lower the temperature. A temperature sensor incorporated into the air conditioner L13x may be used to control the temperature instead of the temperature sensor.

The forced cooling air supply channel L2 comprises, as shown in FIG. 1, a duct L21 arranged in the outside of the plant growth chamber 1 (for example, under the roof) and an air conditioner L22 as being a forced cooling part arranged in the middle of the duct L21. An upstream side of the duct L21 above the air conditioner L22 is connected with a portion between the natural cooling part L12 and the valve 6V in the circulation channel L1 and a downstream side of the duct L21 from the air conditioner L22 is divergently connected to each valve 6V.

A method for using the plant growth system Z having the above arrangement will be described below.

Figure 8:
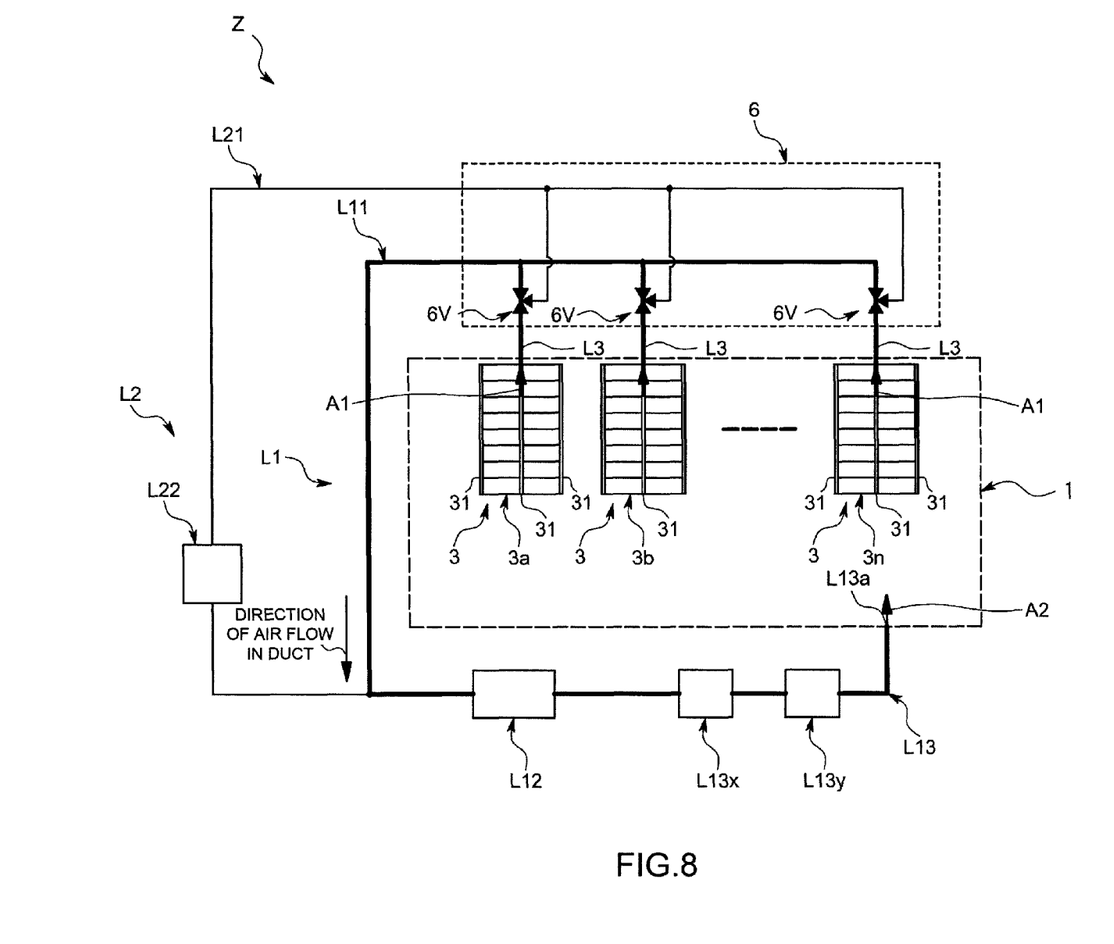
FIG. 8 is a view to explain an operation of the plant growth system of this embodiment (in an air sucking state).

Normal case (in case that the channel connected to the air inlet 31a is the circulation channel L1)
As shown by a heavy line in FIG. 8, each of the individual channels L3 is connected with the circulation channel L1 by the valve 6V of the channel switch part 6 and an air sucking state is set during the daytime cycle and an air blowing out state is set during the nighttime cycle by means of an air flow direction switch part, not shown in drawings.

During the daytime cycle, the air in the cover 332 is heated by the light source 331 that irradiates the light to the plants. The heated air A1 in the cover 332 is sucked by the circulation channel L1 through the air inlet 31a. Then the air A1 is cooled down by the natural cooling part L12 arranged in the middle of the circulation channel L1 and blown out into the plant growth chamber 1 through the air inlet L13a of the duct L13, and then taken into the cover 332 through the ventilation bores 332x as the fresh air. In this embodiment, it is possible to obtain a cooling effect of a maximum of twenty and several degrees by the natural cooling part L12.

As a result, it is possible to prevent a problem that the plants get damaged by the heated air A1 near the light source 331. In addition, since the air can be exchanged by a soft air flow, the plants would not be stressed by the air flow, thereby causing no defects such as insufficient growth. Furthermore, even though the plants are closely-planted, it is possible to efficiently exchange the air near the plants, thereby preventing a shortage of oxygen or heat damage for the plants.

In addition, since the light from the light source 331 reaches the plants through the transparent plant-facing wall 3321, it is possible to realize a preferable sunshine environment necessary for photosynthesis. Furthermore, since the light source 331 is surrounded by the cover 332, the plants will never suffer from a problem such as leaf scorch due to direct contact with the light source 331, even though the light source 331 is arranged close to the plants.

During the nighttime cycle, "the air blowing out state" is set by means of the air flow direction switch part not shown in drawings. At this time no cooling is conducted by the air conditioning L13x so as to make use of the cooling performance by the natural cooling part 12 as much as possible. In "the air blowing out state" the air taken from the air inlet L13a is cooled down by the natural cooling part L12, and the naturally cooled air is introduced to the inside of the cover 332 through the air inlet 31a and then directly supplied to the plants through the ventilation bores 332x of the cover 332. As mentioned, it is possible to preferably realize a growing environment such as a sunshine environment created at night, in which the plants produce sugar in a cold state so that the plants containing much more sugar can be produced while using the system.

Figure 9:
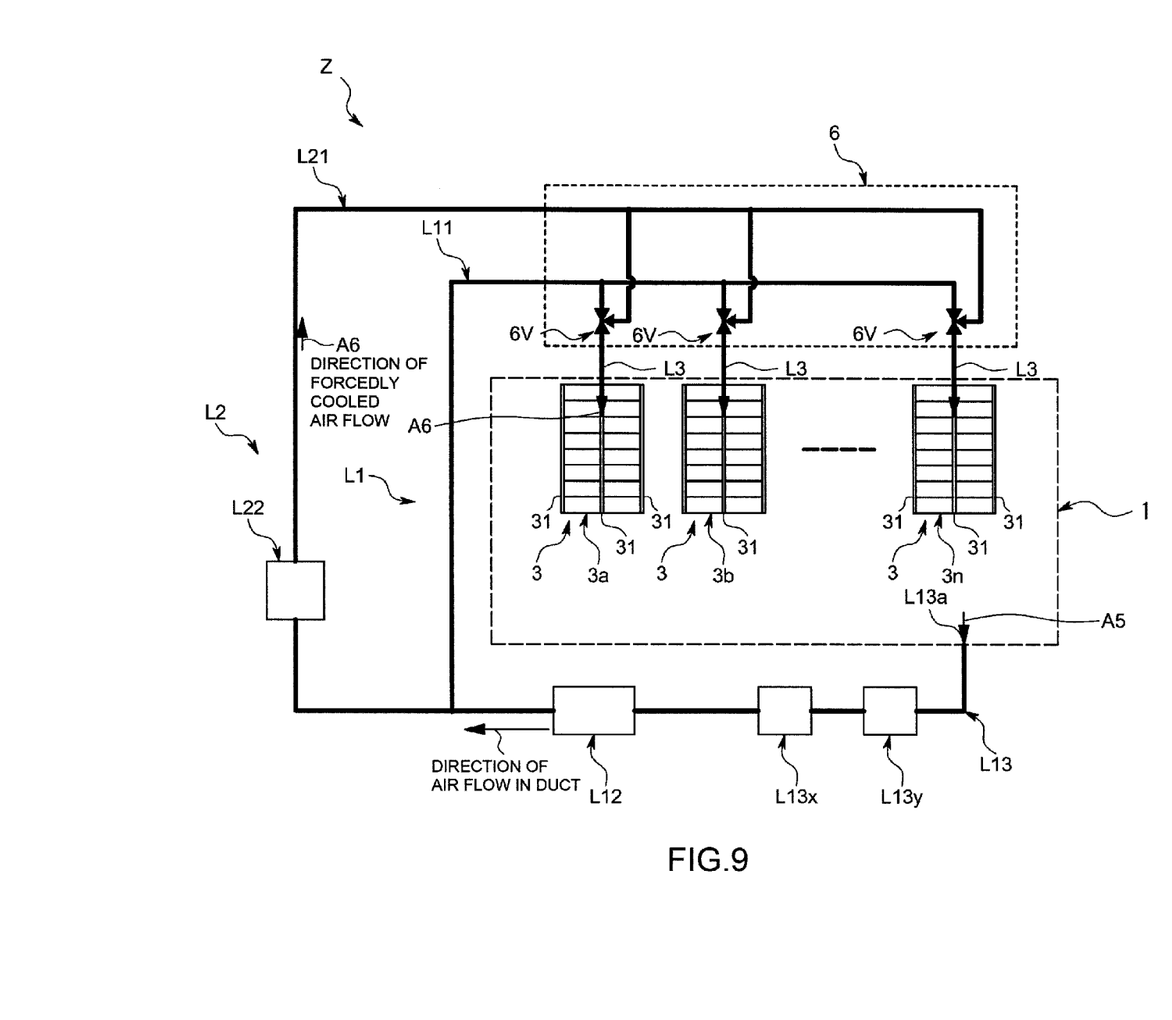
FIG. 9 is a view to explain an operation of the plant growth system of this embodiment (in a forced cooling state).

Forced cooling time (in case that the channel connected to the air inlet 31a is the forced cooling air supply channel L2)
Irrespective of the above-mentioned daytime cycle and nighttime cycle, it is also possible to forcibly cool down the inside of the shelf unit 3. In this case, the individual channel L3 connected to the shelf unit 3 where the forced cooling is conducted may be connected to the forced cooling air supply channel L2 by means of the channel switch part 6. More concretely, the air conditioner L22 alone is put into operation in a state that the individual channel L3 and the forced cooling air supply channel L2 are connected (The air conditioner L13x is not operated fundamentally.) The air A5 in the plant growth chamber 1 is taken into the duct L13 through the air inlet L13a and then cooled down by passing the air filter L13y and the natural cooling part L12 in this order, and further cooled down forcibly by the air conditioner L22 arranged in the duct L21. The forcibly cooled down air A6 is introduced into the cover 332 through the individual channel L3 and the air inlet 31a, and then directly supplied to the plants through the ventilation bores 332x of the cover 332. It is also possible to forcibly cool down multiple shelf units 3 at once. In addition, as shown by a heavy line in FIG. 9, it is also possible to supply all of the shelf units 3 with the air by the use of both the circulation channel L1 and the forced cooling air supply channel L2. Furthermore, it is also possible to make the air conditioner L13x put into operation in addition to the air conditioner L22.

As mentioned, in accordance with the plant growth system Z of this embodiment, it is possible to provide the plant growth system Z that can give a suitable environment for the plants to grow with effectively ensuring a sufficient amount of light for the plants to grow by arranging the light source 331 and the plants as close as possible without causing a problem such that the plants get damaged due to the heated air although the density of the plants in a vertical direction of the shelf part 32 is increased.

In addition, since the air cooled down in the nighttime cycle is blown out into the inside of the cover 332 by means of the air flow direction switch part so as to realize the environment for the plants to produce the sugar, it is possible to produce the plants containing much more sugar in spite of utilizing the same system. The air blown out to the plant during the nighttime cycle will not be heated by the turnedoff light source 331. As a result, there would be no problem such that the plants get damaged due to the heat from the blown air.

In addition, since the ventilation bores 332x are arranged on generally whole surface of the plant-facing wall 3321, it is possible to take in the air near the plants through the ventilation bores 332x and circulate the air over whole of the shelf part 32 irrespective of a distance between the shelf posts 31. As a result, a restriction on designing the shelf part 32 or the shelf posts 31 becomes small.

Since the natural cooling part L12 for naturally cooling the air is arranged in the circulation channel L1, it is possible to conduct the cooling process efficiently with low cost by making use of the property of the natural cooling, namely, the heat of the air at high temperature can be deprived effectively.

Since the natural cooling part L12 has an arrangement that multiple cooling pipes Lp connected in series or in parallel are buried in a vertical state at a position deeper than 5 meters below ground, it is possible to cool down the air preferably by making use of a condition where the temperature at a position 5 meters below ground is about 16 degrees C.

In addition, since the cooling pipe Lp is the double channel arrangement having the center internal flow channel Lp1 and the outer internal flow channel Lp2 located in the outside of the center internal flow channel Lp1, and the air A1 taken into the cooling pipe Lp flows in the outer internal flow channel Lp2 and the center internal flow channel Lp1 in this order, the air cooled-down deep in the ground can be prevented from being heated at a time when the air returns to the surface of the ground so that the moderately cooled-down air can be provided to the plants.

The present claimed invention is not limited to the above-mentioned embodiment.

For example, the forced cooling air supply channel L2 is not necessarily required.

In addition, the configuration of the shelf unit 3 is not limited to this embodiment.

Furthermore, the configuration of the natural cooling part L12 is not limited to this embodiment.

In addition, a fluorescent light is used for the light source 331 of the light irradiation unit 33, however, another light source 331 such as the LEDs or the like may also be used.

Figure 10:
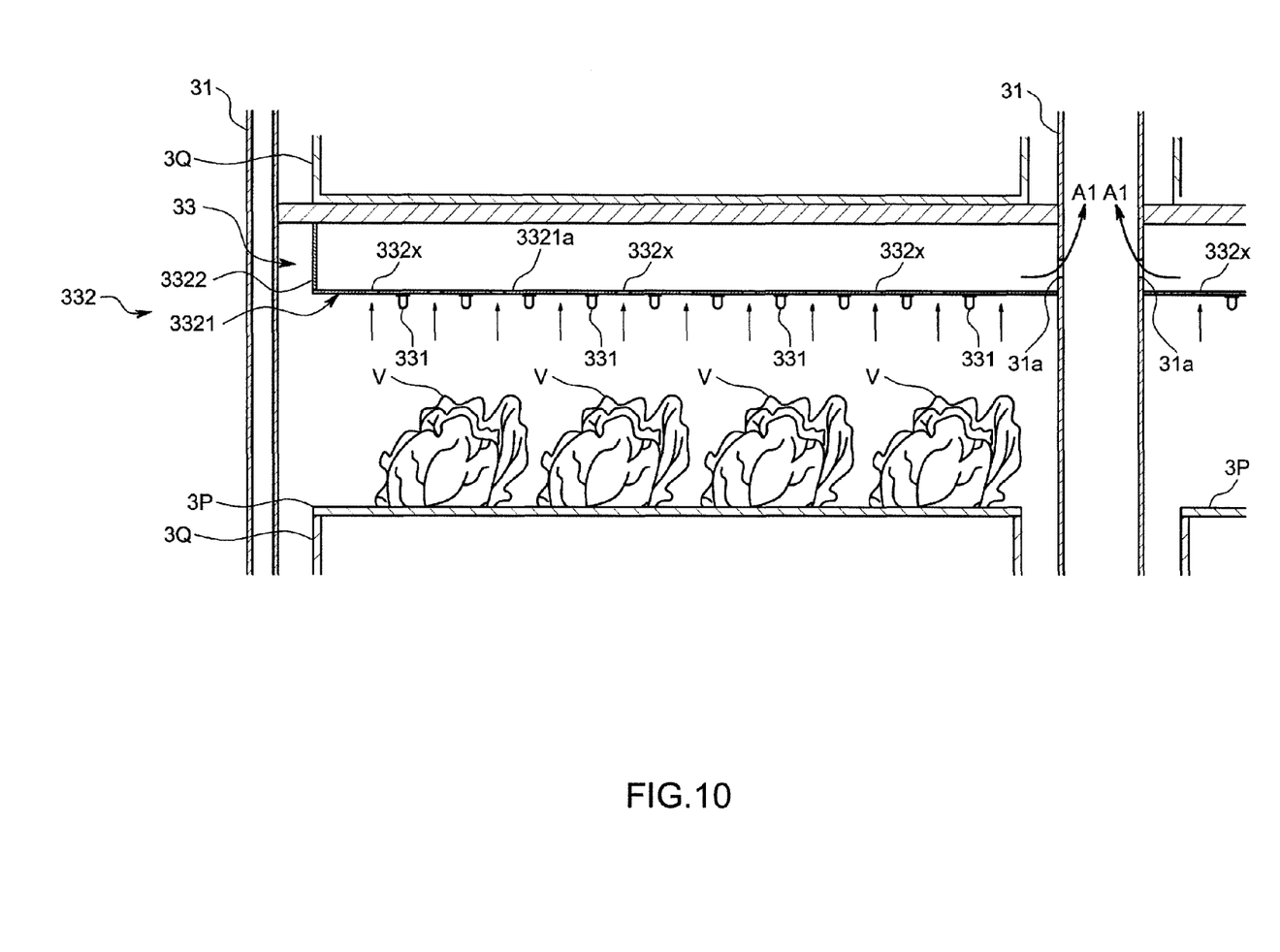
FIG. 10 is an enlarged principal view showing a shelf part of a plant growth system in accordance with another embodiment of this invention.

In case that the LEDs are used for the light source, as shown in FIG. 10, the LEDs 331 are supported by the cover 332 in a state that the LEDs 331 face the plants and the cover 332 comprises a plant-facing wall 3321 as being a board for LEDs and a cover side wall 3322 as being a surrounding part to surround a back surface 3321a of the plant-facing wall 3321 on which the LEDs are loaded, wherein an air inlet 31a opens in a space within the cover 332.

In accordance with this arrangement, since the air heated by the heat generated on the back surface 3321a of the plant-facing wall 3321 on which the LEDs are loaded is sucked into the circulation channel L1 through the air inlet 31a and cooled down, and the fresh air cooled down by the circulation channel L1 circulates around whole of the plant growth chamber 1 and is then taken into the inside of the cover 332 through the ventilation bores 332x, it is possible to obtain the same effect as that of the above-mentioned embodiment. More specifically, it is possible to provide the plant growth system that can give a suitable environment for the plants to grow by effectively ensuring a sufficient amount of light for the plants to grow by arranging the LEDs 331 and the plants as close as possible without causing a problem such that the plants get damaged by the heated air although the density of the plants in a vertical direction of the shelf part 32 is increased and by ensuring a favorable ventilation and preventing a heat damage. Furthermore, since the surface of the LEDs 331 facing the plants will seldom or never generate heat even though the plants are arranged closely to the LEDs 331, it is possible to prevent a problem such as the leaf scorch even though the plants directly touch the LEDs 331.

In addition, the ventilation bores 332x are arranged on the plant-facing wall 3321 of the cover 332, and may be arranged on the cover side wall 3322.

Furthermore, the system to be controlled by the growth environment control part is not limited to the above-mentioned each unit. For example, the system to be controlled may be a system that produces a phenomenon appearing as a natural phenomenon such as a fog generating system that generates fog or a wind generating system that generates wind. The control may not be limited to generating the natural phenomenon.

In addition, a concrete configuration of each part is not limited to the above-mentioned embodiment and may be variously modified without departing from a spirit of the invention.

The invention claimed is:

1. A plant growth system comprising:
multiple shelf parts that are arranged in a chamber and on which plants are to be placed;
a light source arranged above each shelf part for irradiating the plants with light for growth;
a cover that is arranged to surround the light source wherein multiple ventilation bores are formed and at least one part of the cover is a light-permeable transparent wall;
an air inlet that opens in a space within the cover for sucking air in the space;
a circulation channel that cools down air sucked from the air inlet and blows out cooled air into the chamber; and
an air flow direction switch part that switches from an air sucking state to suck the air in the space into the circulation channel through the air inlet when the light source is lit to an air blowing out state to blow out air in the circulation channel into the cover through the air inlet when the light source is turned off.

2. The plant growth system described in claim 1, wherein a natural cooling part to naturally cool down the air sucked from the air inlet is arranged in the circulation channel.

3. The plant growth system described in claim 2, wherein the natural cooling part comprises multiple cooling pipes each of which is connected in series or in parallel; and each of the cooling pipes is buried in a vertical state at a predetermined depth below ground.

4. The plant growth system described in claim 3, wherein the cooling pipe is of a double-channel structure having a center internal flow channel located at a center and an outer internal flow channel located at an outside of the internal flow channel, and air taken into the cooling pipe flows in the outer internal flow channel and the center internal flow channel in sequence.

5. The plant growth system described in claim 1, and comprising:

a forced cooling air supply channel that forcedly cools down air taken from the chamber and supplies the plant with forcedly cooled air; and a channel switch part that switches a channel connected to the air inlet to the circulation channel or to the forced cooling air supply channel.

6. The plant growth system of claim 1, wherein the air inlet is arranged at a generally whole surface of the cover facing the plant.

* * * * *